Patented July 17, 1951

2,560,887

UNITED STATES PATENT OFFICE 2,560,887

ANTHRAQUINONE DYESTUFFS FOR ACETATE RAYON

David I. Randall, Easton, Pa., and Edgar E. Renfrew, Phillipsburg, N. J., assignors to General Aniline & Film Corporation, New York, N. Y., a corporation of Delaware No Drawing. Application December 10, 1949, Serial No. 132,394

6 Claims. (Cl. 260—380)

The invention relates to new and valuable dyestuffs of the anthraquinone series which yield bright blue dyeings on acetate rayon.

Certain wool dyestuffs of the formula:

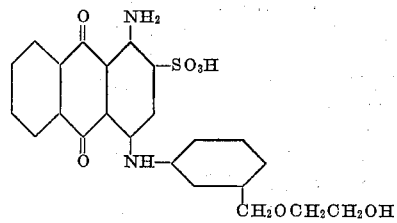

have been produced in Germany and described in Fiat reports (1313).

We have discovered that the corresponding desulfonated products yield dyestuffs on acetate rayon which are substantially fast to fading of acid gases such as combustion gases. The dyestuffs of our invention have the following general formula:

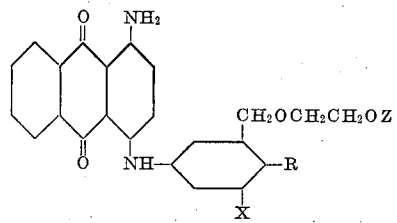

wherein R is selected from the group consisting of hydrogen and methyl, Z is selected from the group consisting of hydrogen and hydroxy alkyl and X is selected from the group consisting of hydrogen and $CH_2OCH_2CH_2OZ$.

These products, which color acetate rayon in valuable blue shades, have good fastness to the action of acid-gas fumes such as the combustion productions of natural gas, motor fuels and coal. Existing dyestuffs which color acetate in similar shades suffer from one or more of the following shortcomings: (a) the dyeings gas-fade badly, (b) they are comparatively unsubstantive, (c) the dyeings are susceptible to shade changes by perspiration, or other acids or alkalies, (d) the dyeings are not fast to light and/or washing, and (e) the dyeings are dull. We have discovered in this series dyestuffs of good substantivity which offer bright dyeings of excellent fastness to gas-fading, light and washing and which maintain their shades over a wide range of service conditions.

These dyestuffs are of higher molecular weight than previously thought possible in acetate rayon dyestuffs, but they possess substituents which apparently enhance the substantivity greatly. These structures, new in this type of dyestuff chemistry, are essentially substitution products of hydroxy alkoxy methyls substituted on the aryl radical of a 1-amino-4-arylamino anthraquinone.

The following examples illustrate preferred embodiments of the invention but it will be understood that variations and substitutions may be made within the scope of the claims.

Example 1

In a suitable flask was placed 24.3 parts by weight sodium 1-amino-4-bromoanthraquinone-2-sulfonate, 10.0 parts sodium bicarbonate, 6.4 parts sodium carbonate, 16.7 parts 2-m-aminobenzyloxyethanol, 1.0 part cuprous chloride and 600.0 parts water. The mixture was heated to 70° C. for ten hours while being stirred. To the warm mixture was added 60.0 parts sodium chloride in 200.0 parts water. The cake which separated when the mixture had cooled was separated by filtration. This cake was reprecipitated twice from 1000 parts 4% salt solution. 12.0 parts of this intermediate, which has the probable structure:

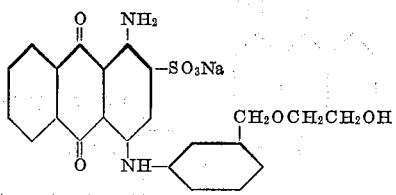

was added to a solution of 250.0 parts water and 7.0 parts aqueous ammonia, 28%. To this solution at 70° was added a cool solution of 5.0 parts sodium dithionite ("sodium hydrosulfite," $Na_2S_2O_4 2H_2O$) in 100.0 parts water. The mixture was stirred at 70° C. until the blue component was no longer soluble. After cooling, the mixture was filtered and the cake washed with water. The undried cake was milled to dryess with an equal weight (on a dry basis) of a suitable dispersing agent (for example, Marasperse CB, produced by the Marathon Corporation; it is described as a "partially desulfonated sodium lignosulfonate"). The product yielded bright blue dyeings on acetate rayon in good strength, the fastness to washing, light and acid gas fumes was very good. The reaction may be represented as follows:

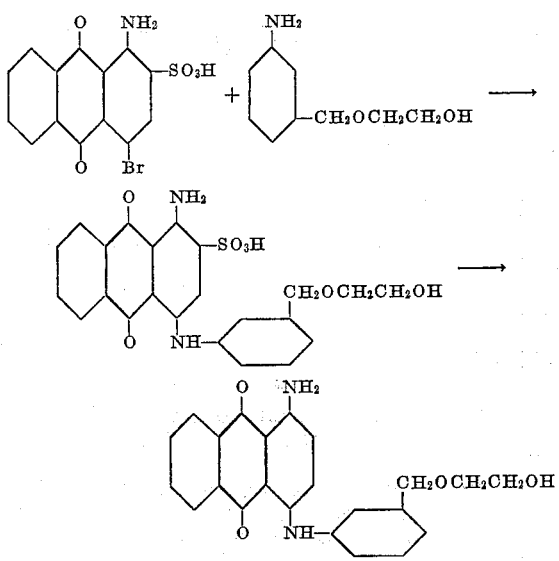

*Example 2*

The product of probable structure:

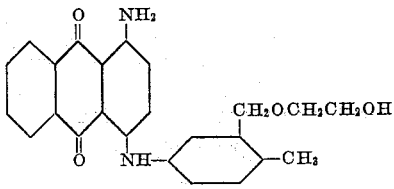

was prepared by the same method as the product of Example 1, except that an equivalent amount of 2-(5-amino-o-tolylmethoxy) ethanol was substituted for the 2-m-aminobenzyloxyethanol in the primary reaction. The dyestuff produced colored cellulose acetate fibers in somewhat bluer shades than those yielded by the product of Example 1; the other properties were quite similar.

*Example 3*

The product of probable structure:

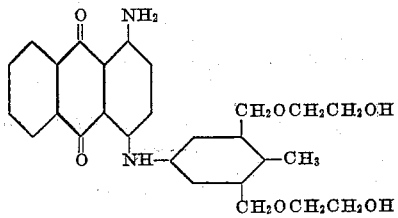

was prepared by the procedure described in Example 1, except that an equivalent amount of 2,2'-(4-amino-2,6-tolylene dimethoxy) diethanol was substituted for the 2-m-aminobenzyloxyethanol. The dyestuff which resulted from the desulfonation of the primary condensation yielded bright blue dyeings on cellulose acetate fibers, of excellent properties, especially in fastness to light, washing, and acid gas fading.

*Example 4*

The dyestuff of probable structure:

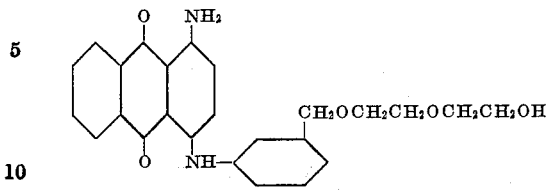

was prepared in a manner similar to that of Example 1, except that an equivalent amount of 2-(2-m-aminobenzyloxyethoxy) ethanol was used instead of the 2-m-aminobenzyloxyethanol in the primary reaction. The dyestuff which resulted from the desulfonation of the primary condensation product yielded bright blue dyeings of good strength on cellulose acetate fibers. The properties were excellent.

We claim:

1. New acetate rayon dyestuffs of the general formula:

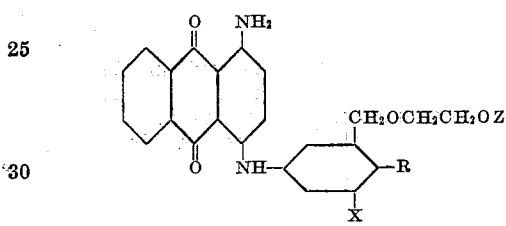

wherein R is selected from the group consisting of hydrogen and methyl, Z is selected from the group consisting of hydrogen and hydroxy alkyl and X is selected from the group consisting of hydrogen and CH₂OCH₂CH₂OZ.

2. A new dyestuff of the formula:

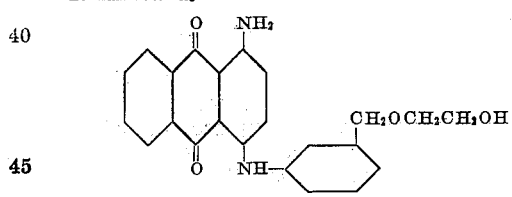

3. A new dyestuff of the formula:

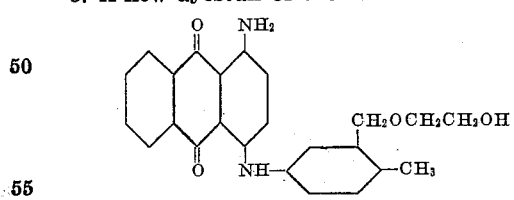

4. A new dyestuff of the formula:

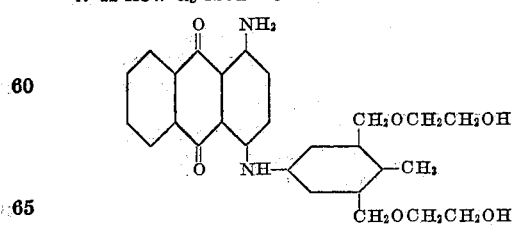

5. A new dyestuff of the formula:

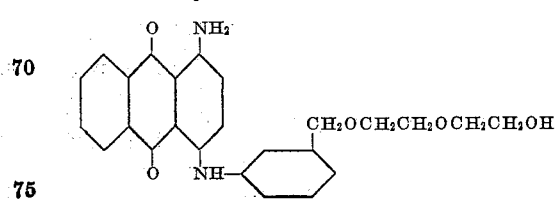

6. A method for preparing a new dyestuff of the formula:

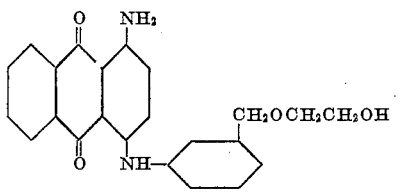

which comprises reacting sodium 1-amino-4-bromoanthraquinone - 2 - sulfonate with 2 - m - aminobenzyloxyethanol followed by desulfonation.

DAVID I. RANDALL.
EDGAR E. RENFREW.

REFERENCES CITED

The following references are of record in the file of this patent:

UNITED STATES PATENTS

| Number | Name | Date |
|---|---|---|
| 1,973,025 | Taube et al. | Sept. 11, 1934 |
| 2,053,343 | Lodge et al. | Sept. 8, 1936 |
| 2,172,763 | Lee | Sept. 12, 1939 |
| 2,353,108 | Wuertz | July 4, 1944 |

FOREIGN PATENTS

| Number | Country | Date |
|---|---|---|
| 593,955 | Great Britain | Oct. 30, 1947 |